United States Patent Office 3,442,851
Patented May 6, 1969

3,442,851
POLYMERIZATION OF CAST ACRYLIC RESINS
Robert J. McManimie, Glendale, Mo., assignor to Monsanto Company, St. Louis, Mo., a corporation of Delaware
No Drawing. Continuation-in-part of application Ser. No. 423,862, Jan. 6, 1965. This application Dec. 17, 1965, Ser. No. 514,672
Int. Cl. C08f 1/84, 1/78
U.S. Cl. 260—41                              16 Claims The present invention is a continuation-in-part of application of an earlier filed U.S. patent application Ser. No. 423,862, filed Jan. 6, 1965, now Patent No. 3,324,074.

This invention relates to a process for preparing polymeric compositions. One specific aspect of the invention relates to a process for preparing rigid polymeric compositions comprising an alkyl methacrylate polymer and and inorganic material.

The terms "reinforcing agent" and "reinforcing medium" apply to inorganic substances, subsequently described in detail which are bonded to a polymer through a coupler. This is in distinction to inorganics which serve as fillers or diluents for a polymer system and are not bound to the polymer matrix. The terms "reinforced polymeric composition" and "reinforced polymer" refer to those compositions comprising a polymer and reinforcing agent wherein the reinforcing agent is bound to the polymer through a third component referred to as a coupling agent. A coupling agent is a compound containing two or more reactive groups, at least one of which is suitable for reaction with the polymer or monomer, and at least one of which is suitable for reaction with a reinforcing agent. The term "granular" as used subsequently in this disclosure refers to particles wherein the smallest and largest dimensions of a single particle differ by no more than a factor of about five. The term "acicular" refers to particles having a length over diameter ratio ($l/d$) of from five to fifteen.

Most conventional processes for casting acrylic sheet having a thickness of 0.5 inch or less require a lengthy polymerization time ranging from about 12 to more than 24 hours. For articles having a smallest dimension larger than 0.5 inch, the casting procedure is also conducted at superatmospheric pressure. Extreme care and carefully controlled conditions are required to produce a cast acrylic sheet free from bubbles and voids. Such care is necessitated by the fact that acrylic resins polymerize with the evolution of large amounts of heat even though the application of a certain amount of heat is desirable at the onset and at the end of the polymerization to reduce the total curing time. In a casting polymerization of acrylic sheet, the polymerization proceeds slowly at first and is accelerated by the application of heat. The monomer is of low viscosity and chain termination and initiation are balanced. As the polymerization monomer reaches the gel stage, chain termination is diminished and the internal temperature rises sharply, thereby accelerating the polymerization even more and causing the evolution of even more heat. If the exotherm is not controlled, the heat build-up can cause the monomer to boil, thus producing a sheet full of bubbles and disfigurations, or even worse, the reaction may reach the point of explosive violence resulting in damage to the molds and other equipment. If the exotherm is controlled and the system is brought to substantial completion without damage to the casting, heat is again applied to polymerize the remaining 3 or 4% residual monomer. A typical procedure for casting a ⅛ or 3/16 inch sheet of polymethyl methacrylate comprises adding 0.5% benzoyl peroxide to the uninhibited monomer and heating the mixture with agitation to about 90° C. for eight to ten minutes, followed by rapid cooling to room temperature. The prepolymer so formed can then be treated with plasticizers, fillers, dyes, pigments, stabilizers and the like, after which time the prepolymer is deaerated and either refrigerated or used immediately. When ready for casting, a flat sheet mold is filled with the prepolymer syrup and placed in an oven at 42° C. for 12 to 18 hours, after which time the sheet is heated to 95 to 98° C. over a one hour period and held at this temperature for an additional 30 minutes. Despite the production costs connected with such a manufacturing process, the demand for cast acrylic sheet has continued to increase. The clarity, brilliance, and almost gem-like quality of cast acrylics have done much to convince the public that plastics are not cheap substitutes but new materials with a new scope of uses.

The acrylics are also useful in a variety of applications utilizing some of their physical and mechanical properties other than clarity such as weather resistance, good tensile properties and impact strength. Some applications for translucent or opaque acrylics include outdoor advertising displays, exterior and interior wall cladding, room dividers, shower enclosures and doors.

In addition to polymerization casting, injection molding and extrusion can also be used to prepare acrylic sheet. A comparison of properties shows that cast acrylic is a better product. Cast sheet is harder than extruded sheet, has a higher tensile strength, lower elongation, better heat distortion properties and better machining characteristics. Extruded sheet has a price advantage, however.

Recently, an accelerated catalyst system has been developed which permits a reduction in total casting time from about 24 hours or more to about two hours or less. This system utilizes an accelerator comprising a boron compound of the formula $BR_3$ where each R can be a hydrogen, hydrocarbon, hydrocarbonoxy, halogen, or —$OBR_2$ group. The boron compound is complexed with a weak base having an ionization constant in the range of $10^{-5}$ to $10^{-11}$ to form an accelerator of the desired reactivity with the peroxygen free radical catalyst. By careful temperature control in some medium such as a water bath to insure good heat transfer, a flawless sheet ¼ inch thick can be cast in 45 minutes to an hour using the accelerated catalyst system just described. A subsequent one hour cure at an elevated temperature completes the polymerization. The enormous reduction in polymerization time is sufficient to place cast acrylics on an economically competitive basis with molded and extruded acrylics.

Another recent development in the area of cast acrylic technology comprises the coupling of acrylic resins to inorganic materials through difunctional organosilicon compounds having at least one functional group for reaction with the surface of the inorganic and at least one functional group for interpolymerization into the acrylic polymer chain. Such a process permits the fabrication of acrylic sheet having increased tensile and flexural strengths and moduli with little or no loss in impact strength, albeit a reduction from crystal clarity to translucence or opacity.

Although the accelerator system discussed above represents a significant advance in the area of acrylic polymerization, even further reductions in polymerization time would constitute another improvement. If, simultaneously with such an improvement, a process could be employed which would produce a cast acrylic sheet of exceptionally good mechanical properties, the advantages would be obvious—the fabrication of a mechanically superior cast acrylic sheet in a matter of minutes. Providing a process capable of achieving the above improvements constitutes the principal objects of the present invention. Additional objects, benefits and advantages will become apparent in view of the following detailed description.

The instant invention is directed to a process for casting acrylic sheet comprising polymerizing an alkyl methacrylate monomer in the presence of a free radical catalyst whose decomposition is accelerated by a complexed boron compound of the formula $Z \cdot BR_3$ where each R can be a hydrogen, hydrocarbon, hydrocarbonoxy, halogen, or $-OBR_2$ group and Z is a weakly basic complexing agent having an ionization constant in the range of about $10^{-5}$ to $10^{-11}$ and in the presence of at least 33% by weight inorganic material, said material being sufficiently dispersed and distributed throughout the monomer to serve as an effective heat sink for the exothermic heat of polymerization.

The alkyl methacrylate monomers useful herein include methyl methacrylate, ethyl methacrylate, n-propyl methacrylate, isopropyl methacrylate, and the isomeric butyl methacrylates. Monomer mixtures can also be employed. A preferred mixture consists of methyl methacrylate and one or more alkyl acrylates or alkyl methacrylates, e.g., ethyl acrylate, propyl acrylate, 2-ethyl hexyl acrylate, butyl methacrylate and lauryl methacrylate. Polymeric network structures, in distinction to generally linear structures, can be obtained by polymerizing an alkyl methacrylate with a polyfunctional methacrylate such as ethylene glycol dimethacrylate, propylene glycol dimethacrylate, butylene glycol dimethacrylate, polyethylene glycol dimethacrylate and trimethylolpropane trimethacrylate. Thus, the term "alkyl methacrylate polymer" as used herein, is intended to include alkyl methacrylate homopolymers and alkyl methacrylate copolymers of alkyl methacrylates with other alkyl methacrylates and/or alkyl acrylates. Alkyl methacrylate polymers also encompass the copolymers of an alkyl methacrylate with other monomers copolymerizable therewith, for example styrene, α-methyl styrene and other substituted styrenes such as the ring-substituted methyl styrenes, biallyl, acrylonitrile, maleic anhydride, 2-hydroxy alkyl methacrylates and methacrylonitrile.

The alkyl methacrylate polymers useful in the preparation of these novel compositions can be linear or crosslinked. Crosslinking provides some improvement in physical properties, particularly heat distortion temperature, but the linear polymers are also definitely included within the scope of this invention. The maximum amount of tolerable crosslinking in the polymer depends upon the proposed use of the finished composition. Increased crosslinking produces compositions with higher heat distortion temperature, but somewhat lower impact strentgh and flexural strength. Consequently, control of crosslinking provides a variable which enables one to tailor the polymer to produce a composition of the desired properties. A suitable amount of crosslinking is that which will provide a polymer with an effective molecular weight around 20,000 or more, preferably 30,000 or more. Therefore a linear alkyl methacrylate polymer with a molecular weight around 20,000 or more may not need to be crosslinked whereas a lower molecular weight polymer, e.g. a polymer with a molecular weight of 5,000 or less, would be better utilized in the practice of this invention if it were crosslinked. Suitable crosslinking agents are well known in the art and can be used here in the conventional manner. Crosslinking can be achieved through the coupler by hydrolysis of silanol groups to form siloxane linkages, i.e.

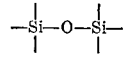

and by the use of polyfunctional monomers as described above. Similarly, the term "alkyl methacrylate" refers to the monomer alone as well as mixtures of alkyl methacrylates with other monomers such as set forth above.

Inorganic materials suitable for use as fillers or reinforcing agents are those materials which are substantially insoluble in water, i.e. less soluble than 0.15 gram per liter. Such materials can be selected from a variety of minerals, primarily metals, metal oxides, metal salts such as metal aluminates and metal silicates, other siliceous materials, and mixtures thereof. Generally, those materials which have or can acquire an alkaline surface upon treatment with a base are best suited for the reinforcement of polymeric compositions. Since metal silicates and siliceous materials usually have or can readily acquire the desired alkaline surface, a preferred mixture for use in this invention is one which contains a major amount, i.e. more than 50% by weight, of metal silicates or siliceous materials. Materials with such characteristics are preferred because of the ease with which they can be coupled to the polymer. However, other substances such as alumina which are coupled to an alkyl methacrylate polymer by the use of higher levels of coupling agents, can be used as reinforcing components either singly or preferably combined with other minerals which are more susceptible to coupling, and more preferably combined in minor amounts, i.e. percentages of less than 50% of the total reinforcing material. An example of such a material useful as a reinforcing agent, with which alumina can be mixed, is feldspar, an igneous crystalline mineral containing about 67% $SiO_2$, about 20% $Al_2O_3$, and about 13% alkali metal and alkaline earth metal oxides. Feldspar is one of the preferred reinforcing agents of this invention and a feldspar-alumina mixture is also useful. Other materials particularly preferred as reinforcing agents are those materials with an alkaline surface such as wollastonite, which is a calcium metal silicate; asbestos, such as chrysotile, a hydrated magnesium silicate; crocidolite; and other calcium magnesium silicates. Other useful reinforcing agents include: quartz and other forms of silica, such as silica gel, ground glass, glass fibers, cristobalite, etc.; metals such as aluminum, tin, lead, magnesium, calcium, strontium, barium, titanium, zirconium, vanadium, chromium, manganese, iron, cobalt, nickel, copper, and zinc; metal oxides such as oxides of aluminum, tin, lead, magnesium, calcium, strontium, barium, titanium, zirconium, vanadium, chromium, manganese, iron, cobalt, nickel, copper, and zinc; heavy metal phosphates, sulfides and sulfates; and minerals and mineral salts such as spodumene, mullite, mica, montmorillonite, kaolinite, bentonite, hectorite, beidellite, attapulgite, graphite, chrysolite, garnet, saponite and hercynite.

The term "inorganic material" or simply "inorganic" used in this disclosure refers to materials such as exemplified above. Particularly preferred are those inorganic siliceous materials which have or can acquire an alkaline surface upon treatment with a base and which have a 3-dimensional crystal structure as opposed to a 2-dimensional or planar crystal configuration. These siliceous materials are also characterized by a somewhat refractory nature with a melting point above about 800° C., a Moh's hardness of at least 4, and a water solubility of less than 0.1 gram per liter. Examples of preferred siliceous materials include minerals such as feldspar, quartz, wollastonite, mullite, wyanite, chrysolite, cristobalite, crocidolite, fibrous aluminum silicate having the formula $Al_2SiO_5$, spodumene and garnet. These minerals are especially desirable for use in the reinforcement of polyalkyl methacrylate compositions for a number of reasons. For instance, they provide a composition with better abrasion resistance, flexural strength and modulus, tensile strength and modulus, impact resistance, resistance to heat distortion and resistance to thermal expansion than do conventional clay fillers and inorganic pigments such as whiting. Further, they provide higher loading levels than can be achieved with glass fibers, an important economic consideration. In addition, these highly loaded monomer slurries can be directly cast into a final polymerized form thereby eliminating several processing steps necessary with glass-fiber-reinforced compositions.

The amount of filler or reinforcing agent to be used in the preparation of the polymeric composition can vary over a wide range with the maximum content being limited primarily by the ability of the polymer to bind the reinforcing medium into a cohesive mass. Techniques subsequently described herein have enabled me to prepare polymeric compositions containing as much as 85 or 90% by weight inorganic. The lower range of inorganic concentration is limited to about 33% by weight. Although some benefits of shortened polymerization time can be attained by using less than 33% inorganic or by using a fibrous mat or other shape or size of inorganic such as coarse ¼ inch aggregate, the improvement is not significant until the inorganic acting as a heat sink acquires the limitations of size, shape and quantity imposed hereinabove and below. A preferable lower limit for the inorganic is 40% by weight of the total composition. Suitable values for inorganic concentration in the finished composition range from about 40 to 90% and more preferably from about 50 to 90% by weight of the total composition. Objects which are not to be subsequently reworked can be prepared with higher levels of reinforcing agent.

Inorganic shape, size and size distribution are important considerations. Generally, the greatest improvements in mechanical properties are achieved by the use of fibrous inorganics such as glass fibers. For the inorganic to function as an effective heat sing, however, in the particular methacrylate polymerization under discussion when only 33% by weight inorganic is employed, it is necessary for the inorganic to be of such a shape and size to permit thorough dispersion. Particles which pass through an 18 mesh sieve of the U.S. sieve series (U.S. Bureau of Standards, Standard Screen Series, 1919) are capable of sufficiently good dispersion that a methacrylate slurry containing only 33% inorganic can be polymerized rapidly and smoothly. If 50 or 60 or 70% inorganic is used, the inorganic can be more fibrous in nature, of a larger size, or both. As a general rule, the upper limit on the size of inorganic is limited to the smallest dimension of the cast article. In the case of ¼ inch acrylic sheet, this would be ¼ inch. Usually, most of the inorganic is such that it will pass an 18 mesh sieve (1000µ). Particles as small as 100 or 200 millimicrons can also be used.

Particle size distribution is a variable which permits good packing of inorganic to achieve high loadings and good heat sink characteristics. More descriptive of suitable particles than limits on particle size is a specification of particle size distribution. A suitable wide particle size distribution is as follows:

| | Percent |
|---|---|
| 250µ or less (60 mesh) | 100 |
| 149µ or less (100 mesh) | 90 |
| 44µ or less (325 mesh) | 50 |
| 5µ or less | 10 |

A narrower distribution also suitable for use in this invention is.

| | Percent |
|---|---|
| 62µ or less (230 mesh) | 100 |
| 44µ or less (325 mesh) | 90 |
| 11µ or less | 50 |
| 8µ or less | 10 |

A relatively coarse mixture useful in this invention has the following particle size distribution:

| | Percent |
|---|---|
| 250µ or less (60 mesh) | 100 |
| 149µ or less (100 mesh) | 90 |
| 105µ or less (140 mesh) | 50 |
| 44µ or less (325 mesh) | 10 |

A suitable finely divided mixture has the following particle size distribution:

| | Percent |
|---|---|
| 44µ or less (325 mesh) | 100 |
| 10µ or less | 90 |
| 2µ or less | 50 |
| 0.5µ or less | 10 |

These figures regarding particle size distribution should not be construed as limiting since both wider and narrower ranges of distribution will also be useful as well as both coarser and finer compositions. Rather these figures are intended as representative illustrations of inorganic compositions suitable for use in preparing the reinforced polymeric compositions. As an example of the variety of particle sizes which can be used in the subject reinforced polymeric compositions, large aggregate an inch or more in diameter can also be incorporated into the polymer matrix for special effects. Examples include ground glass, roofing granules, quartz chips, etc.

Although high loadings and good heat sink characteristics dictate that a granular or acicular inorganic be used, a need for exceptional mechanical properties may require that a quantity of fibrous inorganic be used. The most common fibrous reinforcing agent used is fibrous glass particles. These fibers are most easily incorporated into the polymeric composition when chopped into strands approximately 0.1 to 3 inches in length, and then either added to a prepolymer-coupler mixture as discrete particles or formed into a mat upon which the prepolymer is poured prior to polymerization. These methods of incorporation of glass fibers are known in the art and are mentioned here to demonstrate that the granularly reinforced polymers of this invention can be additionally reinforced by incorporation of fibrous materials according to techniques known in the art or according to the procedure described herein as applicable to granular inorganics.

After optimum particle size distribution of the reinforcing agent is selected for a particular polymer system, it can be appreciated that an upper limit of inorganic can be reached at which point the composition becomes too viscous to be poured into a mold. The viscosity of monomer-inorganic slurries can be reduced by surfactants. Lowered viscosity permits the formation of a finer, smoother finish on the final product. Occasionally a finished composition with a high inorganic content e.g. greater than 70%, may have a granular or coarse texture and may even contain voids or open spaces due to the inability of the viscous mixture to flow together completely prior to polymerization. The addition of a surface-active agent eliminates this problem and produces a smooth, attractive finish on highly loaded compositions. If a smooth finish is not a necessary feature for certain applications, then a decrease in viscosity permits incorporation of large amounts of inorganic into the monomer feed. Anionic, cationic, or nonionic surface active agents can be used to reduce the slurry viscosity and materials such as zinc stearate, long alkyl chain trimethylammonium halides, and alkylene oxide condensates of long carbon chain compounds have been used successfully.

As catalysts for inducing the polymerization reaction there may be used any compounds which will generate free radicals under the reaction conditions, although the hydroperoxy compounds are preferred. Specific classes of compounds which can be used include peroxides, such as di-acetyl peroxide, acetyl benzoyl peroxide, dipropionyl peroxide, dilauryoyl peroxide, benzoyl peroxide, dimethyl peroxide, diethyl peroxide, dipropyl peroxide, tetralin peroxide, cyclohexane peroxide, acetone peroxide; hydroperoxides such as cyclohexyl hydroperoxide, cumene hydroperoxide, t-butyl hydroperoxide, methyl cyclohexyl hydroperoxide, hydrazine derivatives, such as hydrazine hydrochloride, hydrazine sulfate, dibenzoylhydrazine, diacetylhydrazine, trimethylhydrazinium iodide; amine oxides, such as, pyridine oxide, trimethylamine oxide, dimethylaniline oxide; alkali metal and ammonium persulfates, perborates, and percarbonates; compounds containing the group $>C=N-$ and derived from ketaldones, i.e. a ketone or aldehyde, such as the azines (containing the group $>C=N-N=C<$) e.g., benzalazine, heptaldazine and diphenylketazine; oximes (containing the group C=NOH) such as d-camphor oxime, acetone oxime, alphabenzil dioxime, butyraldoxime, alpha-benzoin oxime, oxime, dimethylglyoxime; hydrazones (containing the group $>C=N-N<$) such as benzaldehyde phenylhydrazone, phenylhydrazones of cyclohexanone, cyclopentanone; semicarbazones (containing the group $$>C=N-NHCONH_2)$$

such as semicarbazones of acetone, methyl ethyl ketone, diethyl ketone biacetyl, cyclopentanone, cylohexanone, acetophenone, propiophenone, camphor and benzophenone; Schiff's bases (containing the group $>C=N-$) such as benzalaniline, benzal-p-toluidine, benzal-o-toluidine, benzaldehyde derivatives of methylamine, ethylamine and heptylamine, anils and analogous compounds of other amines, such as acetaldehyde anil, isobutyraldehyde anil, heptaldehyde anil, etc.; oxygen; and the reaction products of organometallics such as cadmium alkyls, zinc alkyls, tetraethyl lead, aluminum alkyls, etc. with oxygen.

These catalysts are generally used in amounts from about 0.001% to 0.5% by weight based on the total reactants. While it is generally not necessary, for attaining extremely high rates of reaction or for other special purposes, even higher amounts of catalysts may be used; for example, amounts ranging up to as high as 1% or even 5% as an upper limit can be employed.

Compounds used as activators include the boron hydrides (boranes) and substituted boranes such as borane, diborane, triborane, tetraborane, trimethylborane, triethylborane, tripropylborane, trihexylborane, trioctylborane, tridecylborane, tri-tridecylborane, tricyclohexylborane, triphenylborane, tribenzylborane, triphenethylborane, tri-monomethylbenzylborane, and tritolylborane. Preferred are trialkylboranes where each alkyl group has from 1 to about 14 carbon atoms.

The boron compounds are complexed with a basic complexing agent having an ionization constant from about $10^{-5}$ to about $10^{-11}$, preferably from $10^{-7}$ to $10^{-10}$. Particularly preferred are amino compounds having an ionization constant between $10^{-7}$ and $10^{-10}$, one notable example being pyridine. Other suitable amines which can be used include methylamine, di-methylamine, trimethylamine, dimethylbutyl amine, n-octylamine, the picolines, aniline, dimethylaniline, the toluidines, triethylenediamine and mixtures of several different amines. The mole ratio of amine to boron compound is within the range of 0.1:2 to about 10:1, and is preferably within the range of 0.5:1 to 2:1.

The catalyst system, a trialkylborane-complexing agent with a preferred hydroperoxide compound, permits a rapid polymerization reaction to high conversion without the risks of a runaway-type reaction. Although amines are preferred as complexing agents for the trialkylborane, other compounds can also be used for this purpose such as tetrahydrofuran, triphenylphosphine, beryllium hydroxide, strychnine, codeine, cocaine, novacain, toluidine and nicotine.

As the subsequent examples will show, a filled alkyl methacrylate sheet $3/16$ inch thick can be cast in less than ten minutes, representing approximately a twelve-fold reduction in casting time by comparison to a similarly prepared unifilled sheet. Further, the accelerator and catalyst can be modified to provide a smooth, fast, trouble-free, room temperature polymerization.

The mechanical properties of the filled acrylic sheets are as expected. The sheets are more rigid (higher modulus) but also weaker (lower tensile and flexural strengths) and more brittle (lower impact resistance). As a result, their use is restricted. The mechanical properties of the filled acrylic sheets can be upgraded considerably even to exceed the properties of an unfilled sheet by converting the inorganic filler to a reinforcing agent through use of a coupler.

An essential material in the preparation of reinforced polymeric compositions is the coupling agent which binds the inorganic to the polymer. A coupling agent can be characterized by its functional groups wherein one group is capable of reaction with the monomer during polymerization and at least one group is capable of reaction with the inorganic. Preferred coupling agent contain an organic group having a terminal carbon to carbon double bond and at least one hydrolyzable group attached to silicon atom. The inorganic and coupler are joined by combining them in the absence or presence of water, alcohol, doxane, etc. Presumably, the hydrolyzable group of the coupler reacts with the hydrogen atoms of appended hydroxyl groups attached to the surface of inorganic materials having an alkaline surface. Theoretically, these hydroxyl groups are present on the surface of, or can be developed upon the surface of, most metallic and siliceous substances, thereby providing a site available for reaction with a hydrolyzable silane group. This theory of availability of hydroxyl groups on an inorganic surface may explain why many silicon-containing minerals are preferred reinforcing agents since the reaction of the hydrolyzable silane groups of the coupler with the silanol groups, i.e.

of the reinforcing agent produces the very stable siloxane linkage,

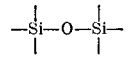

Regardless of any theoretical explanation advanced herein, to which I do not intend to be bound, the oxysilane group is attached to the inorganic by contacting the two components. The composition is preferably but not necessarily subsequently dried. A bond between the inorganic and coupler is thus obtained. This reaction of inorganic and coupler may be carried out separately, and the dried inorganic-coupler adduct subsequently added to the monomer, or the reaction may be carried out in the presence of the monomer and the whole mixture dried to remove volatile reaction products and solvent, if used. Preferably, heat is applied to a coupler-inorganic mixture to increase the extent of bonding.

Preferred silane coupling agents are characterized by the formula

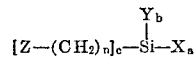

where Z is a radical interpolymerizable with a methacrylate monomer or reactive with a polyalkyl methacrylate polymer, examples being vinyl, allyl, acryloxy methacryloxy, and other radicals containing ethylenic unsaturation, Y is a hydrocarbyl radical, X is a radical capable of reaction with the surface of an inorganic, examples being halogen, alkoxy, cycloalkoxy, aryloxy, alkoxycarbonyl, aryloxycarbonyl, alkyl carboxylate, aryl carboxylate, and hydroxyl radicals, $n$ is an integer from 1 to about 20, $a$ is an integer from 1 to 3, $b$ is an integer from 0 to 2, $c$ is an integer from 1 to 3, and the sum of $a+b+c$ equals 4. Particularly preferred are coupling agents of the above formula where the integer $a$ is 3, $b$ is 0, and $c$ is 1, where X is an alkoxy radical, and Z is a methacryloxy group, e.g.

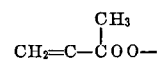

The function of the Z group and X group have already been discussed. The alkylene group in the formula above, $-(CH_2)_n-$, serves as a bridge between the polymer-reactive group and the silane group of a coupler. The alkylene bridge is usually present in a coupling agent because of the additional stability it contributes to the coupling agent. The Y group can be any hydrocarbyl group; the function of the Y group can be to modify the extent of the polymer-inorganic bond, to regulate viscosity of the monomer slurry, or it need not serve any function at all in the polymeric composition. Its presence may be due to a necessity or desirability to use a hydrocarbyl-substituted silane reactant in the synthesis of a silane coupler. Examples of suggested couplers include vinyl triethoxysilane, vinyl methyldichlorosilane, di-(3-methacryloxypropyl) dipropoxysilane, and 6-acryloxyhexyl tricyclohexoysilane.

In addition to silicon-based couplers, phosphorus-based couplers comprise another class of reinforcing agents. These compounds, containing functional groups corresponding to the X, Y and Z, groups of the above formula, are adequately exemplified in R. E. Miller's copending application Ser. No. 333,630, filed Dec. 26, 1963, now Patent No. 3,344,107. Other compounds useful as coupling agents include the coordinated chromium complexes which contain at least one polymer-reactive radical and at least one inorganic-reactive radical corresponding to the Z and X groups of the formula above. Examples include methacryloxychromic chloride, acryloxy chromic chloride, crotonyloxy chromic chloride, sorbyloxy chromic chloride, 3,4-epoxybutylchromic chloride, and methacryloxy chromic hydroxide. Other difunctional compounds useful as couplers include sodium salt of methacrylic acid, allyl chloride, methyl ester of 3,4-epoxybutanoic acid and 1-hexenol-6.

The amount of coupler with which the reinforcing agent is treated is relatively small. As little as one gram of coupling agent per 1000 grams of reinforcing agent produces a polymeric composition with physical properties vastly superior to those of a polymeric composition containing an untreated filler. Generally, quantities of coupler in the range of 2.0 to 20.0 grams per 1000 grams of reinforcing agent have been found most satisfactory although quantities in excess of that range may also be used with some detriment to the properties of the finished product.

The actual steps in the polymerization can be carried out in a number of ways. For instance, the inorganic and monomer can be mixed together in the presence of atmospheric oxygen which acts as a polymerization inhibitor. An organic hydroperoxide or other inefficient methacrylate polymerization catalyst can be added to the monomer-inorganic slurry followed by the complexed borane accelerator, after which addition the catalyzed slurry is cast into the molds. The advantage of such a procedure is that the molecular oxygen which acts as an inhibitor before the accelerator is added, acts as a catalyst after addition of the borane. Hence, the system operates to best advantage without the necessity for excluding or removing oxygen at some stage of the reaction. Alternatively, the accelerator can be added to an oxygen-free, uncatalyzed inorganic-monomer slurry followed by addition of the catalyst. Or both accelerator and initiator can be added to an oxygen-free system at 0° C. and then cast into a mold at some higher temperature. If a coupling agent is used, the coupler can be combined with the inorganic prior to or subsequent to addition to the monomer. Substantial coupler-inorganic reaction is aided by application of heat in the range of 90 to 100° C. When the alkyl methacrylate monomer is used as a dispersing solvent, a satisfactory technique for achieving good coupler-inorganic reaction comprises adding the coupler to the monomer, adding the inorganic to the mixture, stirring thoroughly and heating to 100° C., cooling the resultant slurry to 0° to 25° C., adding initiator and accelerator, and casting into a mold.

Another component which can be added to the monomer slurry to modify the properties of the cast methacrylate article is a rubbery polymer. The rubber can contribute to the impact strength of the finished composition. The rubbery polymer component can be used in quantities ranging up to about 15%, more preferably from about 1% to about 10%, by weight of the alkyl methacrylate polymer. Higher rubber contents are of course included within the scope of this invention, especially if the rubber selected is a partially degraded, low molecular weight rubber of low viscosity. Reinforced polyalkyl methacrylates having up to about 10% dispersed rubber based on the alkyl methacrylate can be readily prepared using techniques described in the subsequent examples. Handling difficulties are experienced when the rubber content is increased beyond 10 or 11%. Other techniques such as a pressurized injection into the mold are of course available and permit the polymerization of cast shapes of reinforced polyalkyl methacrylate having 20% or more dispersed rubber. The present invention is limited in one preferred aspect, however, to compositions having a maximum of about 15% by weight dispersed rubber based on the alkyl methacrylate. This is because of the unsatisfactory flexural properties achieved at higher rubber concentrations. A maximum rubber concentration of 10% is particularly preferred because of the ease of casting and molding combined with the very extensive and satisfactory range of mechanical properties which can be achieved in reinforced methacrylates having from 1 to 10% dispersed rubber.

For convenience in preparing the reinforced compositions, selection of a rubbery polymer that is soluble in the alkyl methacrylate monomer system is preferred, although other rubbers not completely soluble can be used with some sacrifice in product uniformity. Suitable rubbery polymers include the polybutadiene rubbers, polyisoprene rubbers, styrene/butadiene rubber, natural rubber, acrylonitrile/butadiene rubber, butadiene/vinyl pyridine rubber, butadiene/styrene/vinyl pyridine rubber, polychloroprene, isobutylene/isoprene rubber, ethylene/vinyl acetate rubber, ethylene/propylene rubber and ethylene/propylene/conjugated diene rubber. Preferred are those rubbery polymers named above which contain little or no crosslinked gel.

The rubber must be thoroughly dispersed throughout the reinforced methacrylate composition. To achieve the maximum benefits of this invention, namely optimization of flexural strength and modulus as well as impact resistance by comparison to an unreinforced polyalkyl methacrylate, it is necessary that the rubber be interpolymerized into the methacrylate polymer chain. A simple blend of the polymeric components will not yield as satisfactory a combination of mechanical properties as will an interpolymer of the rubber and polyalkyl methacrylate. Simple noninterpolymerized reinforced methacrylate-rubber blends are nevertheless useful for certain applications where impact strength is not an essential feature. As an example, 1 to 5% of a saturated acrylic rubber, incapable of substantial interpolymerization, is useful in reinforced polyalkyl methacrylate floor tiles to prevent the yellowing that accompanies use of unsaturated rubbers. Retardation of settling of particulate reinforcement can also be achieved by use of noninterpolymerized dispersed rubbers.

In order to illustrate some of the various aspects and advantages of the invention, representative examples are given herein. It will, of course, be understood that variations can be made in the reactants and conditions of the examples without departing from the invention.

EXAMPLE 1

To 2000 grams of wollastonite is added 1200 ml. of methanol containing 5 grams of 2-methacryloxyethyl trimethoxysilane. A slurry is mixed and placed in a hood to evaporate the methanol. The mineral is then heated at 210° C. in an oven for 75 minutes, cooled and milled in a ball mill. To 335 grams of methylmethacrylate is added 6.7 grams of benzoyl peroxide and 782 grams of the treated wollastonite. After thorough mixing, the slurry is subjected to a vacuum of approximately 55 mm. of mercury for about 5 minutes. The slurry is then cast into a mold preheated to 65° C. and is maintained at this temperature for 20 hours. The resultant polymeric composition contains 70% by weight wollastonite or a volume fraction of 0.42.

EXAMPLE 2

A glass reactor was charged with 175.0 g. methyl methacrylate and 408.2 g. of Supersil silica sand of 325 mesh.

The charge of silica sand gave a calculated volume fraction of 0.43, which is equivalent to 68% by weight of the total composition. To the well stirred slurry was added 4.38 ml. cumene hydroperoxide followed by 11.5 ml. of a solution of triethylborane/pyridine complex in a nonylphenol-ethylene oxide condensation product. This catalyst component was prepared by adding 115.4 ml. pyridine to a solution of 140.6 g. triethylborane and 341.8 ml. of the nonylphenol-ethylene oxide condensate (Tergitol NP–27). The reactants were thoroughly mixed for 30 seconds and then poured into a plate mold wherein the plates were spaced ¼ inch apart by a rubber gasket. The mold was preheated to 40° C. and the polymerization exotherm, reaching 51° C., was observed after the reactants had been in the mold for about 30 minutes. The mold was immediately opened after the exotherm was measured and a smooth glossy solid composition obtained. Samples were cut from this plate for physical testing (Table I).

EXAMPLE 3

The procedure and charge used in this run were identical to those of Example 2 with the exception that in the instant example the Supersil silica sand was treated with a coupling agent prior to mixing with the other reactants. The silica sand, 500 g. was treated with 250 ml. methanol containing 1.25 g. 3-methacryloxypropyl trimethoxysilane. The methanol was then evaporated from the well stirred slurry at atmospheric pressure and the treated silica sand finally dried in an oven at 210° C. for 1 hour and fifteen minutes.

The polymerization exotherm was measured at 49° C. 30 minutes after the slurry was transferred to the preheated mold. The mold was then cooled to room temperature, opened and a smooth glossy solid polymer composition removed and cut with a diamond saw to obtain samples for evaluation (Table I).

EXAMPLE 4

To a quantity of 525 grams of methyl methacrylate is added 13.1 ml. of cumene hydroperoxide and 34.5 ml. of a solution of the triethyl borane-pyridine complex dissolved in the nonylphenolethylene oxide condensation product. After mixing the catalyst, accelerator and monomer for 30 seconds, the catalyzed mixture is cast into a ¼ inch thick sheet mold cooled to 20° C. in a water bath. The peak exotherm occurs about 2 hours after casting and reaches about 95 to 100° C. if the temperature is closely regulated. The sample is allowed to cool to 90° C. and held at this temperature for an additional thirty minutes. Properties of the finished article, reported in Table I, are comparable to the properties of a conventionally cast polymethyl methacrylate sheet.

EXAMPLE 5

A comparison of the products prepared in Examples 1, 2, 3 and 4 is made in Table I.

TABLE I

| Product of— | Flexural strength (p.s.i.) | Flexural modulus (p.s.i.) | Total polymerization time (hrs.) |
| --- | --- | --- | --- |
| Example 1 | 16,300 | $2.6 \times 10^5$ | 20 |
| Example 2 | 6,700 | $1.7 \times 10^5$ | 0.5 |
| Example 3 | 14,400 | $1.9 \times 10^5$ | 0.5 |
| Example 4 | 13,500 | $0.4 \times 10^6$ | 2.5 |

It can be seen that the product of Example 2, which does not contain a coupling agent, does not have the surprising properties of flexural strength possessed by the product of Example 3. The reinforced composition prepared in Example 3 exhibits more than 210% increase in flexural strength over the product of Example 2 prepared without the coupling agent. Flexural modulus is also increased. The flexural strength and modulus are determined by ASTM D–790. Regardless of whether or not a coupler is used, the complexed borane accelerator results in a dramatic reduction in polymerization time. Example 1 sets forth a conventional procedure for casting an acrylic sheet using an unaccelerated peroxide catalyst. Example 4 demonstrates the approximately 10 fold reduction in time achieved by the use of the complexed borane accelerator. Examples 2 and 3 demonstrate the even further improvement achieved by the addition of an inorganic phase as a heat sink, and as an agent to improve the thermal conductivity of the casting. Comparison of the mechanical properties of the four samples shows that use of a coupler is advisable if mechanically strong acrylic sheet is to be prepared in a very short casting cycle such as 30 minutes or less.

EXAMPLE 6

Examples 6 and 7 are provided to demonstrate the changes in mechanical properties of reinforced polymers that are made by methods used to couple the particulate mineral to the polymer.

In this run a glass reactor is charged with 350 g. methyl methacrylate, 4.0 g. trimethylolpropane trimethacrylate and 700 g. wollastonite that had been treated with 3-trimethoxysilylpropyl methacrylate in methanol solution (5.0 g. of the coupling agent per 2000 g. of wollastonite). The mineral-coupling agent had been dried in an oven at 210° C. for 75 minutes, cooled and ground in a ball mill prior to use. These reactants are thoroughly stirred in the reactor and 8.75 ml. cumene hydroperoxide added followed by the addition of 24.5 ml. triethylborane/pyridine complex in the ethylene oxide-nonylphenol condensate as described in Example 2. Thorough mixing is continued for 30 seconds and the reaction mixture then poured into a simple polished plate mold at 40° C. The plates of the mold are separated ¼ inch by the use of rubber gaskets. After 13 minutes polymerization time within the mold, the maximum reaction exotherm occurs, reaching 55° C. The mold is immediately cooled and the sample removed from the plates. The solid polymeric sheet is cut into two pieces. One piece is further divided to obtain samples for physical testing and the other piece post cured for 17 hours in an oven at 90° C. Evaluation data is reported in Table II.

EXAMPLE 7

The weight of reactants used in this run is generally equivalent to the weight used in Example 6 but the general procedure is modified. A glass reactor is charged with 350 g. methyl methacrylate and 8.4 g. trimethylolpropane trimethacrylate. The wollastonite used in this preparation had been ground in a ball mill and dried in an oven at 90° C. for 16 hours and then cooled. The wollastonite, 700 g., is added in portions to the reactor along with 3.75 ml. cumene hydroperoxide and 1.68 ml. 3-trimethoxysilylpropyl methacrylate. The reactants are thoroughly agitated in an atmosphere of nitrogen and then 24.5 ml. of the triethylborane/pyridine catalyst is added, as used in Example 6. The materials are thoroughly mixed for 30 seconds and then poured into a plate mold preheated to 40° C. The maximum reaction temperature reaches 82° C. 17 minutes after the material is transferred to the mold. The mold is cooled, the solid glossy product removed from the mold and cut into 2 pieces, 1 of which is subjected to a post cure in an oven at 90° C. for 17 hours. Thereafter samples are cut from both sections for evaluation for physical properties (Table II).

EXAMPLE 8

In this run the reactor is charged with 350 g. methyl methacrylate, 8.4 g. trimethylolpropane trimethacrylate, 1.68 ml. 3-trimethoxysilylpropyl methacrylate and 700 g. wollastonite that had been ground in a ball mill. These reactants are thoroughly mixed and then heated to 100° C. under refluxing conditions. A vacuum is gradually applied to the reactor to slowly distill off 15 ml. of liquid. The reactants are then cooled to room temperature and an addition of 15 ml. methyl methacrylate made. The reactants are stirred in an atmosphere of nitrogen as 8.75 ml. cumene hydroperoxide is added followed by 24.5 ml. triethylborane/pyridine catalyst as previously described. The mixture is stirred for an additional 30 seconds and then rapidly poured into a plate mold previously heated to 40° C. The peak reaction exotherm occurs 17 minutes after transfer of the material to the mold and was noted at 84° C. The mold is then cooled to room temperature and the composition removed and divided into two equal sections. One section is post cured for 17 hours at 90° C. in an oven and then cooled. Thereafter, both sections are cut to prepare samples for physical property evaluation (Table II). This example also demonstrates the feasibility of in situ reaction of coupler and inorganic.

EXAMPLE 9

Physical properties of the product described in Examples 6 to 8 are summarized in the following Table II. It can be seen that a post curing step improves the physical property of each of the samples evaluated.

TABLE II

|  | Post cure | Flexural Strength (p.s.i.) | Corrected impact strength (ft. lb/id. notch) |
|---|---|---|---|
| Example 6 | No | 15,500 | 0.25 |
|  | Yes | 16,000 | 0.29 |
| Example 7 | No | 9,800 | 0.31 |
|  | Yes | 10,600 | 0.32 |
| Example 8 | No | 16,300 | 0.31 |
|  | Yes | 17,000 | 0.31 |

The foregoing data indicate that hydrolyzing conditions are required to obtain a chemical bond between the mineral and the coupling agent. Thus in Example 6 and Example 8 water was present, absorbed on the wallastonite, and occurred in a sufficient quantity to hydrolyze the coupling agent. On the other hand, in Example 7 the water was driven off the surface of the mineral and hydrolysis of the coupling agent was prevented. Thus there was not a good chemical bond between the wallastonite and the coupling agent so that the properties of the finished composition were not nearly as good as those obtained by the procedures of Example 6 and Example 8.

EXAMPLE 10

To 285 grams of methylmethacrylate is added 15 grams of a styrene/butadiene rubbery copolymer (FRS-182). After solution of the components, 7.5 ml. of cumene hydroperoxide and 600 grams of wollastonite treated according to the procedure described in Example 1 are added. To the resultant slurry is added 28.5 ml. of a solution of a triethylborane/pyridine complex in a nonylphenol-ethylene oxide condensation product (Tergitol NP-27). This complex is prepared by adding 140 grams of triethyl borane to a solution of 115 ml. of pyridine and 341 ml. of the nonylphenol-ethylene oxide condensate. After thorough mixing, the monomer slurry is poured into a mold maintained at room temperature. After about an hour, the temperature of the polymerizing mixture rises to a peak of about 50° C. Upon cooling to room temperature the resultant polymeric composition is removed. One-half of the composition is cut to prepare samples for evaluation; the second half is subjected to a post cure in an oven for 3 hours at 90° C. and then cut to prepare samples for evaluation. Total elapsed polymerization time is about 75 minutes at room temperature (25° C.).

EXAMPLE 11

To 1280 grams of methylmethacrylate is added 64 grams of a styrene/butadiene rubbery copolymer (FRS-1006). After solution of components, 2395 grams of wollastonite treated as described in Example 1, 31 grams of trimethylolpropane trimethacrylate and 16 ml. of cumene hydroperoxide are added with stirring. After thorough mixing and application of a vacuum to remove entrapped air, 42 ml. of the triethylborane pyridine complex described in Example 10 is added. Stirring is continued for 30 seconds and the reactants then poured into a simple mold maintained at room temperature. After 1 hour the polymerized material is removed from the mold. The resultant polymeric composition contains 4.8% by weight rubbery copolymer and 63% by weight reinforcing agent.

EXAMPLE 12

In this example, the mechanical properties of the finished polymeric compositions are demonstrated. Table III below gives flexural strength, flexural moduli, and impact resistance values for some of the polymeric compositions of this invention. The flexural strength and modulus values were determined in accordance with ASTM-D 790. Impact resistance was determined by the Notched Izod Impact described in ASTM-D 256. The numerical designations of polymeric compositions indicate compositions prepared in the manner described in the corresponding examples.

TABLE III

| Polymeric composition | Flexural strength, (p.l.i.) | Flexural modulus, p.s.i. | Izod impact, ft. lb./in. | Total polymerization time |
|---|---|---|---|---|
| 10 | 12,200 | 1.1 | .49 (.28) | |
| Post cured | 11,900 | 1.1 | .55 (.35) | 75 min. (r.t.). |
| 11 | 15,600 | 1.6 | .31 (.10) | 60 min. (r.t.). |

The above examples demonstrate a room temperature polymerization of an acrylic sheet requiring a total elapsed time of less than two hours. It should be noted that the molds were neither heated or cooled externally at any time during the casting cycle.

EXAMPLE 13

To 335 g. of methyl methacrylate is added 23.5 g. of a styrene/butadiene rubbery copolymer (FRS-1006), 6.7 g. of acrylonitrile, 2.3 ml. of cumene hydroperoxide and 622 g. of wollastonite treated as described in Example 1 except that 3-(trimethoxysilyl)propyl methacrylate is used as a coupling agent. After thorough mixing and application of a vacuum, the slurry is charged with 6 ml. of the triethylborane/pyridine complex described in Example 8. The slurry is stirred for 30 seconds and then poured into a mold preheated to 60° C. After a peak exotherm of 66° C. appearing about 20 minutes after casting, the composition is cooled to room temperature and removed from the mold. The resultant polymeric composition contains 63% by weight reinforcing agent. The polymeric phase contains 2% by weight polymerized acrylonitrile and 6.6% by weight rubbery copolymer.

EXAMPLE 14

To 295 g. of methyl methacrylate is added 23.5 g. of a styrene/butadiene rubber copolymer (FRS-1006), 18 g. of acrylonitrile, 2.3 ml. of cumene hydroperoxide and 583.3 g. of wollastonite treated as described in Example 13. After thorough mixing and application of a vacuum to remove dissolved and entrapped air, the slurry is charged with 6 ml. of the triethylborane/pyridine complex described in Example 8. Following a 30 second agitation, the slurry is cast into a mold preheated to 60° C. A peak polymerization exotherm occurred at 65° C. about 4 minutes after casting. About 10 minutes after casting, the polymerized composition is removed from the mold. The resulting polymeric composition contained 63% by weight reinforcing agent. The polymeric phase contained 5.3% polymerized acrylonitrile and 7% by weight rubbery copolymer.

EXAMPLE 15

To 135 g. of methyl methacrylate is added 15 g. of lauryl methacrylate, 10.5 g. of an acrylonitrile rubber copolymer (Hycar 1053), 1 ml. of cumene hydroperoxide, 134 g. of wollastonite pretreated with 0.25% of trimethoxysilylundecyl methacrylate according to the procedure described in Example 1, and 272 g. of mullite similarly treated with 0.25% of trimethoxysilylpropyl methacrylate. Following thorough stirring, the slurry is subjected to a vacuum for about 5 minutes to remove disssolved and entrapped air, after which time 2.7 ml. of the triethylborane/pyridine complex described in Example 8 is addded. The slurry is stirred for 30 seconds and then poured into a mold preheated to 65° C. The mold temperature rises to 100° C. over a 10 minute period and is held at this temperature for an additional 10 minutes, after which time the mold is opened and the composition removed. A sample is cut in half and half the sample post cured for 1 hr. at 110° C. The resulting composition contains 71% by weight reinforcing agent and 6.5% by weight rubbery copolymer based upon the total polymer content. The non-rubbery polymeric matrix is a 10/90 laurylmethacrylate/methyl methacrylate copolymer.

EXAMPLE 16

The procedure described in Example 15 is followed exactly except that 15 g. of monomeric ethyl acrylate is used in place of the lauryl methacrylate.

EXAMPLE 17

The following table reports mechanical properties achieved by the use of methyl methacrylate copolymer systems reinforced according to the practice of this invention.

TABLE IV

| Polymeric composition | Flexural strength, p.s.i. | Flexural modulus, p.s.i. | Ozod impact, ft. lbs./in. | Heat distortion, ° C. | Polymerization time (min.) |
| --- | --- | --- | --- | --- | --- |
| 13 | 6,540 | 1.0×10⁶ | .65 (.43) | 60 | 25 |
| Post cured | 12,400 | 1.6 | .56 (.34) | 99 | |
| 14 | 5,600 | 0.84 | .72 (.51) | | 4–10 |
| Post cured | 11,800 | 1.5 | .49 (.28) | | |
| 15 | 4,100 | 0.85 | .37 (.15) | 56 | 10–20 |
| Post cured | | | | | |
| 16 | 8,300 | 1.5 | .32 (.10) | 75 | 10–20 |
| Post cured | | | | | |

The above samples are presented to demonstrate the feasibility of reinforcing methyl methacrylate copolymer systems as well as the feasibility of a 10 minute polymerization time.

EXAMPLE 18

To 196 grams of methyl methacrylate is added 15 grams of an acrylonitrile rubbery copolymer (Hycar 1053). The mixture is stirred until the rubber is dissolved in the methacrylate monomer. To a quantity of 600 grams of wollastonite (200 to 325+ mesh) is added 1.5 grams of 11-trimethoxysilylundecyl methacrylate dissolved in 200 ml. of methanol. The methanol is evaporated from the mineral and the mineral dried at 155° C. for 15 minutes. The treated mineral is added to the monomer slurry together with 6 ml. of cumene hydroperoxide. To the monomer-mineral slurry, 5 ml. of the triethylborane/pyridine complex in Tergitol NP-27 described in Example 8 is added with stirring. After thorough mixing, the slurry is poured into a mold preheated to 60° C. About 5 minutes after casting, a polymerization exotherm occurs, after which time the mold is allowed to cool to room temperature. The finished composition contains 74% reinforcing agent. Rubber content based upon the methyl methacrylate is 7%. Mechanical properties are reported in Table V.

EXAMPLE 19

Example 18 is repeated except that the wollastonite content is adjusted to provide a composition having 70% by weight reinforcing agent. Mechanical properties are reported in Table V.

EXAMPLE 20

Example 19 is repeated except that a comparable quantity of 3-trimethoxysilylpropyl methacrylate is used instead of the 11-trimethoxysilylundecyl methacrylate. Mechanical properties are reported in Table V.

TABLE V

| Polymeric composition | Percent reinforcement | Flexural strength, p.s.i. | Flexural modulus, p.s.i. | Notched impact strength, ft. lbs./in. notch |
| --- | --- | --- | --- | --- |
| 18 | 74 | 19,300 | 3.0×10⁶ | .49 (.23) |
| 19 | 70 | 19,200 | 2.4 | .44 (.20) |
| 20 | 70 | 16,500 | 2.2 | .42 (.18) |

Comparison of samples 19 and 20 show the improvement in flexural properties due solely to the use of 11-trimethoxysilylundecyl methacrylate as a coupler instead of 3-trimethoxysilylpropyl methacrylate. Sample 18 shows an even further improvement in properties due to the higher content of reinforcing agent. Samples having 74% reinforcing agent coupled with 3-trimethoxysilylpropyl methacrylate are markedly inferior to any of the above three samples, presumably because of the inadequate dispersion of the mineral throughout the composition.

Although the invention has been described in terms of specified embodiments which are set forth in considerable detail, it should be understood this was done for illustrative purposes only, and that the invention is not necessarily limited thereto since alternative embodiments and operating techniques will become apparent to those skilled in the art in view of this disclosure. For instance, inorganic materials have been discussed exclusively herein because of their heat-absorbing characteristics, because of the strength of the inorganic-coupler bond which can be attained and because of the inherent reinforcing capabilities. Materials other than inorganics could be used, however, if one or more of the above or other desirable features can be sacrificed. For instance, cellulosic materials such as wood and paper in solid, chip or fiber form have surfaces containing pendant hydroxyl groups which can react with a coupling agent. The bond between coupler and cellulosic material will not be as strong as the coupler-inorganic bond previously described nor with the cellulosic material contribute as much to the mechanical properties of the polymeric compositions. Nevertheless, several specialty compositions can be manufactured using a cellulosic reinforcement. Other materials such as a sintered polyamide molding powder could also be used. Accordingly, these and other modifications are contemplated which can be made without departing from the spirit of the described invention.

What is claimed is:

1. A process for casting acrylic sheet comprising polymerizing an alkyl methacrylate monomer in the presence of a free radical catalyst whose decomposition is accelerated by a complexed boron compound of the formula $Z \cdot BR_3$ where each R can be hydrogen, halogen or hydrocarbon or hydrocarbonoxy group having from 1 to about 14 carbon atoms or $-OBR_2$ group and Z is a weakly basic complexing agent having an ionization constant in the range of about $10^{-5}$ to about $10^{-11}$ and in the presence of at least 33% by weight inorganic filler material having a water solubility less than 0.15 gram per liter, said material being sufficiently dispersed and distributed throughout the monomer to serve as an effective heat sink for the exothermic heat of polymerization.

2. A process according to claim 1 wherein said alkyl methacrylate monomer is methyl methacrylate.

3. A process according to claim 1 wherein said alkyl methacrylate monomer is a mixture of methyl methacrylate and other acrylic monomers.

4. A process according to claim 1 wherein said free radical catalyst is a hydroperoxy compound.

5. A process according to claim 1 wherein each R group is an alkyl group of from 1 to about 14 carbon atoms.

6. A process according to claim 1 wherein said weakly basic complexing agent has an ionization constant of from about $10^{-7}$ to about $10^{-10}$.

7. A process according to claim 6 wherein said weakly basic complexing agent is an amine.

8. A process according to claim 1 wherein said complexed boron compound is a triethyl borane-pyridine complex and wherein said alkyl methacrylate is methyl methacrylate.

9. A process according to claim 1 wherein said inorganic material passes through an 18-mesh U.S. sieve.

10. A process according to claim 1 wherein said inorganic filler material from about 40 to about 90% by weight of the monomer-inorganic slurry.

11. A process according to claim 1 wherein a rubbery polymer is added to said alkyl methacrylate monomer prior to polymerization.

12. A process according to claim 1 wherein said inorganic filler material is reacted with a coupling agent having at least one hydrolyzable functional group capable of reaction with the surface of an inorganic filler material and at least one functional group containing terminal ethylenic unsaturation which is capable of reaction with said monomer during polymerization prior to polymerization of said alkyl methacrylate monomer.

13. A process according to claim 1 wherein said polymerization is carried out at a temperature below about 70° C.

14. A process for casting acrylic sheet comprising:
(a) mixing together an alkyl methacrylate monomer, from about 40 to about 90% by weight based on the total mixture of an inorganic filler material which has a water solubility less than 0.15 gram per liter and which passes through an 18 mesh U.S. sieve, a coupling agent having at least one hydrolyzable functional group capable of reaction with the surface of an inorganic filler material and at least one functional group containing terminal ethylenic unsaturation which is capable of reaction with said monomer during polymerization, a rubbery polymer, a hydroperoxy compound, and a trialkyl borane-pyridine complex wherein said alkyl groups have from 1 to 14 carbon atoms,
(b) casting the above resultant slurry into a mold, and
(c) controlling the exothermic heat of polymerization to produce a finished sheet free from bubbles, voids and imperfections.

15. A process according to claim 14 wherein said alkyl methacrylate monomer is methyl methacrylate and wherein said trialkyl borane is triethyl borone.

16. A process according to claim 14 wherein the polymerization is carried out in the absence of any external temperature control of the casting mold or polymerizing monomer.

References Cited

UNITED STATES PATENTS

| | | | |
|---|---|---|---|
| 2,742,378 | 4/1965 | Te Grotenhuis | 260—827 |
| 2,952,595 | 9/1960 | Jordan et al. | 260—41 |
| 2,989,420 | 11/1958 | Zdanowski | 260—31.8 |
| 3,079,361 | 2/1963 | Plueddemann | 260—41 |
| 3,238,186 | 3/1966 | Schultz et al. | 260—89.5 |
| 3,255,168 | 6/1966 | Borsini et al. | 260—89.5 |

FOREIGN PATENTS 686,760  5/1964  Canada.

OTHER REFERENCES

Furukawa et al.: "Catalytic Reactivity of Organometallic Compounds for Olefin Polymerization" De Markromolekulare Chemie; BD. 31; 159, pages 123–135.

ALLAN LIEBERMAN, *Primary Examiner.*

L. T. JACOBS, *Assistant Examiner.*

U.S. Cl X.R.

260—901

PO-1050
(5/69)

UNITED STATES PATENT OFFICE
CERTIFICATE OF CORRECTION

Patent No. 3,442,851          Dated May 6, 1969

Inventor(s) Robert J. McManimie

It is certified that error appears in the above-identified patent and that said Letters Patent are hereby corrected as shown below:

Column 1, line 19 "and inorganic" should read -- an inorganic --; column 1, line 56 "polymerization" should read -- polymerizing --. Column 3, line 46 "strentgh" should read -- strength --. Column 4, line 55 "wyanite" should read -- kyanite --. Column 5, line 22 "sing" should read -- sink --. Column 6, line 45 "large" should read -- larger --; column 6, lines 73 and 74 "benzoin oxime, oxime," should read -- benzoin oxime, --. Column 7, line 2 "cyclopentanone; semicarbazones" should read -- cyclopentanone, acetophenone, methone, camphor, and benzophenone; semicarbazones --; column 7, line 58 "unifilled" should read -- unfilled --. Column 10, line 6 "methacrylate" should read --methacrylates --. Column 13, line 25 "(ft. lb/ld. notch)" should read -- (ft. lb/in. notch) --. Column 14, line 23 "(p.l.i.)" should read -- p.s.i. --. Column 15, line 6 "addded" should read -- added --; column 15, line 29 "Ozod" should read -- Izod --. Column 16, line 11 "oxysilylundencyl" should read -- oxysilylundecyl --. Column 17, Claim 10, line 23, after "filler material" insert -- comprises --.

SIGNED AND
SEALED

MAR 17 1970

(SEAL)
Attest:

Edward M. Fletcher, Jr.
Attesting Officer

WILLIAM E. SCHUYLER, JR.
Commissioner of Patents